A. I. CLARK.
STARTING MECHANISM FOR EXPLOSION ENGINES.
APPLICATION FILED MAR. 8, 1909.
1,165,849.                                      Patented Dec. 28, 1915.
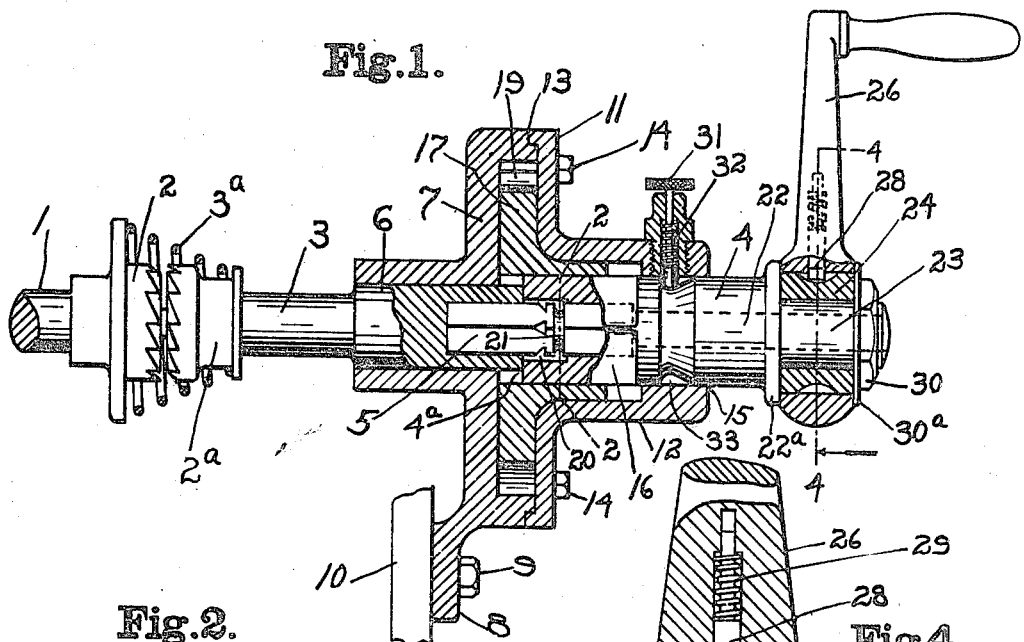
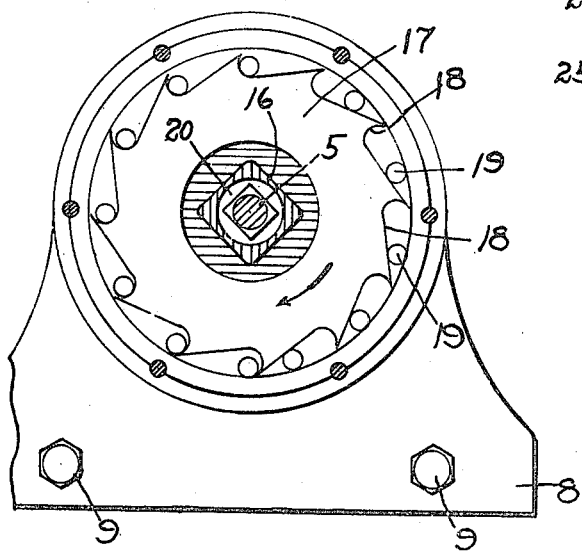
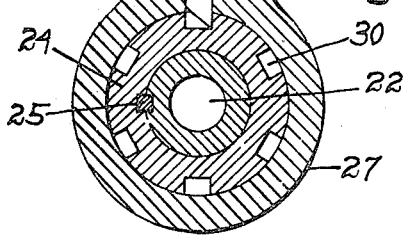
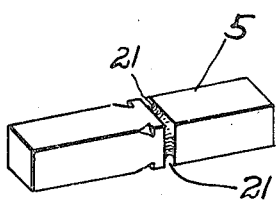
WITNESSES
Willard W. Bardsley.
E. I. Ogden
INVENTOR
Arthur I. Clark.
BY Howard E. Barlow
ATTORNEY

UNITED STATES PATENT OFFICE.

ARTHUR I. CLARK, OF EDGEWOOD, RHODE ISLAND, ASSIGNOR TO FRED L. SMITH, FRANK W. GALE, EMILE MAERTENS, AND JOHN M. HOWARD, OF PROVIDENCE, RHODE ISLAND, J. CLIFFORD TAYLOR, OF CRANSTON, RHODE ISLAND, AND WILLIAM T. LAWRENCE, OF BOSTON, MASSACHUSETTS.

STARTING MECHANISM FOR EXPLOSION-ENGINES.

1,165,849.  Specification of Letters Patent.  Patented Dec. 28, 1915.

Application filed March 8, 1909. Serial No. 481,896.

*To all whom it may concern:*

Be it known that I, ARTHUR I. CLARK, a citizen of the United States, residing at Edgewood, in the town of Cranston, in the county of Providence and State of Rhode Island, have invented certain new and useful Improvements in Starting Mechanism for Explosion-Engines, of which the following is a specification, reference being had therein to the accompanying drawing.

This invention relates to improvements in starting mechanism for internal combustion engines, and has for its object to provide a device of simple, durable and efficient construction that is adapted to be readily attached to an engine and which will positively prevent the starting handle from receiving a backward motion in case a reverse impulse is imparted to the shaft by a premature explosion during the operation of "cranking", the invention being especially applicable for use in connection with explosion engines of automobiles, motor boats and the like.

The ordinary starting mechanism for explosion engines includes a clutch to which is connected an operating or cranking handle, said clutch being connected by the operator, but arranged to be automatically disengaged when the engine begins to run. Some starting mechanisms are also provided with means for disengaging the starting handle from the crank shaft should the crank kick back, but in order to accomplish this disconnecting movement the crank in some of the devices is necessarily pushed forward, which forward movement in some cases may prove as serious as a backward kick of the same.

My improved device provides a clutch which serves as a positive safety element to receive the shock and prevent its being transmitted in any way to the hand of the operator. To accomplish this in a simple and practical manner the starting handle is prevented from turning backward by a clutch. A guard or relief pin or member is inserted between the crank shaft and the clutch and starting handle, which member is adapted to be ruptured or broken by the force of the backward kick of the piston, so as to relieve the shock on the crank pin to prevent damage to the engine and at the same time to prevent an excessive shock acting on the clutch, thus entirely removing the danger usually accompanying the cranking of an explosion engine.

With these and other objects in view, the invention consists of certain novel features of construction, as will be more fully described and particularly pointed out in the appended claims.

In the accompanying drawings, Figure 1 is a side elevation of my improved device partially in section, in position to be connected to the crank shaft of an engine. Fig. 2 is a front elevation showing the clutch member with the front plate or casing removed, also showing the hub, shaft and relief pin in section, on line 2—2 of Fig. 1. Fig. 3 is a perspective view of the relief pin. Fig. 4 is a front elevation or sectional view on line 4—4 of Fig. 1, showing the crank handle in section, the same connected by a ratchet to the starting mechanism.

Referring to the drawings, 1 designates a portion of the engine crank shaft to one end of which is secured a ratchet toothed collar 2. A corresponding ratchet collar $2^a$, held normally out of engagement with collar 2 by spring $3^a$, is fixed to the end of the starting shaft 3, which shaft is made in two parts having a front section 4, the same being connected at the point $4^a$ by the relief pin 5 so that they will be rotated in unison. The rear portion 3 of this shaft receives its bearing at 6 in the casing 7, which casing is provided with a flange 8 adapted to be rigidly secured by means of bolts 9 to the engine base 10, or other convenient place.

A cap 11 provided with an outwardly projecting hub 12 is secured at 13 to the casing 7 by means of bolts 14, which hub forms a supporting bearing at 15 for the front end of the starting shaft 4. The outside of the inner end of shaft 4 is squared as at 16, on which portion is slidably mounted a roller clutch plate 17, see Figs. 1 and 2. The outer periphery of this clutch plate is provided with a plurality of beveled faced notches or teeth 18, and in each notch is loosely mounted a roller 19. The rolls in these notches on one side of the center will naturally, owing to their specific gravity, follow out on the incline face and run in contact with both it and the internal surface of the casing whereby an effort to turn this clutch in the reverse direction would cause these rolls to instantly bind and jam between the inner wall of the starting case and the face of the teeth positively preventing a movement in that direction.

The relief or rupture pin 5 is preferably made square and is turned down at 21, see Figs. 1, 2 and 3, forming a weaker portion or neck where the pin is designed to break or part by the undue strain if the engine should receive a reverse impulse by a premature explosion during the operation of cranking. One end of this pin is loosely inserted into a corresponding socket in one end of the starting shaft 3, and the opposite end fits loosely into a correspondingly square socket in the abutting end of the outer portion 4 of said shaft. The outer end of the pin receiving hole in this portion of the shaft is counterbored at 20 for a short distance, said counterbored portion being large enough so as not to engage the pin 5. By this construction the broken end of the pin will project from shaft 3 so as to be easily taken hold of and removed when shaft 4 is withdrawn from its bearing.

A central hole 22 is made in shaft 4 so that a rod may be inserted therein to knock out the relief pin when the end is left therein after being broken off. The outer end of this shaft 4 is provided with a flange 22ª and is turned down at 23 to receive the ratchet collar 24 which is keyed thereon at 25, see Fig. 4. A starting handle 26 is provided with a hub 27 which is adapted to slip over the collar 24, and the handle is provided with a ratchet pin 28 pressed downward by the spring 29 to engage the slots 30 in said ratchet collar. Both the handle and the collar are retained in position on this shaft by means of the nut 30 and washer 30ª. The pin 31 which is pressed inward by the spring 32, is adapted to engage the annular recess 33 in the shaft 4 for the purpose of retaining this portion of the shaft normally in its outward or disengaged position.

The operation of the device may be more fully described as follows: In order to connect the starting mechanism to the crank shaft it is necessary to press the same inward in the usual way until the teeth of the two clutch members 2 and 2ª are in mesh. The handle 26 may then be moved around on its ratchet until in the most advantageous position for starting when by a revolution more or less of said handle the engine is readily started, but if for any reason the charge in the engine cylinder should explode prematurely the crank starts backward suddenly and with a powerful impulse, and if not provided with a safety attachment this backward kick would be transmitted directly to the operator which would in most cases break his arm or inflict other serious or painful injuries. To entirely obviate the possibility of such an accident occurring, I have divided the starting shaft into two parts 3 and 4 and connected the same by means of a safety or relief pin, which is turned down or reduced at one point 21 until its strength at this point is a little greater than is required to transmit the power through the operating handle which is necessary for starting the engine. A clutch 17 is then mounted on the square end of that portion of the shaft to which the operating handle is connected to positively and effectually prevent the handle from being turned backward. By this construction when a premature explosion takes place in the cylinder as it is impossible for the starting handle to turn backward the relief pin 5 is at once twisted off at the point 21, thereby allowing the engine crank shaft to turn backward and relieve the engine mechanism, at the same time effectually preventing this reverse kick from affecting the operator while cranking the engine. In order to replace this severed relief pin by a fresh one it is only necessary to remove the outer portion of the shaft 4 by raising the retaining spring pin 31, remove the broken piece of the pin from each end of the shaft, insert a new one and slip the outer portion back in position, which may be quickly and readily accomplished, and the device has been restored to working condition again.

My invention is not restricted to the precise construction and arrangement of parts herein shown and described, nor to the various details thereof, as various forms and arrangements of parts may be employed without departing from the spirit and scope of my invention.

My improved device is very effective in its operation and by its use it is impossible to be injured by a premature explosion in the cylinder while cranking the engine.

Having thus described my invention, what I claim as new and desire to secure by Letters Patent, is:

1. In a device of the character described, the combination of an engine shaft with a starting handle, means whereby said handle may be temporarily connected to said shaft, a clutch for preventing a backward motion of said handle, and a pin between said connecting means and said handle, the same being adapted to be severed and allow said shaft to turn backward while said handle is held against rotation.

2. In a device of the character described, the combination of an engine shaft with a starting shaft, said starting shaft being divided, a clutch for connecting one portion of said shaft to the engine shaft, a starting handle on the opposite portion of said shaft, a clutch connected to said handle portion to prevent the same from turning backward, a pin for operatively connecting the two portions of said starting shaft together, said pin being adapted to be severed by a reverse impulse of the engine shaft whereby said shaft is allowed to be turned backward without moving said handle.

3. A starting device for engines, comprising a divided starting shaft, means for temporarily connecting one portion of said shaft to the engine shaft, a starting handle on the opposite portion of the starter shaft, a friction clutch on the latter portion of said shaft to prevent the same from turning backward, a fixed casing for said clutch, a pin non-rotatably held in the abutting ends of said divided shaft for operatively connecting the two together, said pin being adapted to be severed by a reverse impulse of the engine shaft whereby said shaft is allowed to be turned backward without moving said handle.

4. In a device of the character described, the combination of an engine shaft with a starting shaft, said starting shaft being divided, a clutch for connecting one portion of said shaft to the engine shaft, a starting handle on the opposite portion of said shaft, a clutch connected to said handle portion to prevent the same from turning backward, a pin for operatively connecting the two portions of said starting shaft together, said pin being adapted to be severed by a reverse impulse of the engine shaft whereby said shaft is allowed to be turned backward without moving said handle, and means whereby one portion of the starting shaft may be readily withdrawn for the purpose of removing and renewing the ruptured pin.

In testimony whereof I affix my signature in presence of two witnesses.

ARTHUR I. CLARK.

Witnesses:
HOWARD E. BARLOW,
E. I. OGDEN.

Copies of this patent may be obtained for five cents each, by addressing the "Commissioner of Patents, Washington, D. C."